(12) United States Patent
Timm et al.

(10) Patent No.: US 11,641,584 B1
(45) Date of Patent: May 2, 2023

(54) PROTECTING FROM AUTOMATIC RECONNECTION WITH WI-FI ACCESS POINTS HAVING BAD REPUTATIONS

(71) Applicant: NortonLifeLock Inc., Tempe, AZ (US)

(72) Inventors: Reese Timm, Littlerock, CA (US); Roy Fine, McKinney, TX (US)

(73) Assignee: NORTONLIFELOCK INC., Tempe, AZ (US)

( * ) Notice: Subject to any disclaimer, the term of this patent is extended or adjusted under 35 U.S.C. 154(b) by 616 days.

(21) Appl. No.: 16/775,031

(22) Filed: Jan. 28, 2020

(51) Int. Cl.
*H04W 12/082* (2021.01)
*H04L 9/40* (2022.01)
*H04W 76/18* (2018.01)
*H04W 48/20* (2009.01)
*H04W 76/19* (2018.01)
*H04W 48/14* (2009.01)
*H04W 12/37* (2021.01)
*H04W 12/67* (2021.01)
*H04W 12/122* (2021.01)

(52) U.S. Cl.
CPC ....... *H04W 12/082* (2021.01); *H04L 63/1416* (2013.01); *H04L 63/1433* (2013.01); *H04W 12/122* (2021.01); *H04W 12/37* (2021.01); *H04W 12/67* (2021.01); *H04W 48/14* (2013.01); *H04W 48/20* (2013.01); *H04W 76/18* (2018.02); *H04W 76/19* (2018.02)

(58) Field of Classification Search
CPC ... H04W 12/082; H04W 76/19; H04W 76/18; H04W 12/67; H04W 12/37; H04W 12/122; H04W 48/14; H04W 48/20; H04L 63/1416; H04L 63/1433
See application file for complete search history.

(56) References Cited

U.S. PATENT DOCUMENTS

| | | | |
|---|---|---|---|
| 8,646,074 B1* | 2/2014 | Gangadharan | H04W 12/12 726/22 |
| 10,178,122 B1* | 1/2019 | Shavell | H04L 63/1441 |
| 2013/0040603 A1* | 2/2013 | Stahlberg | H04L 63/14 455/410 |
| 2013/0097711 A1* | 4/2013 | Basavapatna | G06F 21/577 726/25 |

* cited by examiner

Primary Examiner — Paul E Callahan
(74) Attorney, Agent, or Firm — Maschoff Brennan

(57) ABSTRACT

Protecting from automatic reconnection with Wi-Fi access points having bad reputations. In some embodiments, a method may include determining that the mobile device is within range of a Wi-Fi access point, determining that the mobile device is configured to automatically reconnect to the Wi-Fi access point, receiving a request to indicate whether the Wi-Fi access point has a bad reputation, accessing an access point reputation database to determine whether the Wi-Fi access point has a bad reputation, sending an indication that the Wi-Fi access point has a bad reputation, and, in response to the indication that the Wi-Fi access point has a bad reputation, protecting the mobile device from the Wi-Fi access point by performing a remedial action at the mobile device.

18 Claims, 3 Drawing Sheets

PROTECTING FROM AUTOMATIC RECONNECTION WITH WI-FI ACCESS POINTS HAVING BAD REPUTATIONS

BACKGROUND

Mobile devices often connect to networks by first connecting to a Wi-Fi access point. A Wi-Fi access point may be a networking hardware device that allows Wi-Fi enabled devices to connect to a network such as the Internet. Wi-Fi access points are often provided in public places to enable users to access the Internet on their mobile devices. For example, coffee shops, libraries, airports, hotels, and other public places may provide one or more Wi-Fi access points to which users may connect their mobile devices in order connect to the Internet. A user may initially connect their mobile device to a Wi-Fi access point by moving the mobile device within range of the Wi-Fi access point and then manually connecting to the Wi-Fi access point, which may involve entering a network security key of the Wi-Fi access point.

One convenient feature of many modern mobile devices is the ability to automatically reconnect to any Wi-Fi access point to which a mobile device was previously manually connected. For example, after a user initially connects to a Wi-Fi access point manually (which may involve entering a network security key of the Wi-Fi access point), each time that the mobile device is once again within range of the Wi-Fi access point, the mobile device may automatically reconnect to the Wi-Fi access point, without requiring any action on the part of the user, including not requiring the user to reenter any network security key of the Wi-Fi access point. This "default automatic reconnection" feature on many modern mobile devices allows a user to easily reconnect to Wi-Fi access points without any effort on the part of the user whenever the user is within range of the Wi-Fi access points.

Unfortunately, Wi-Fi access points can be compromised by a malicious actor or by malicious software and, once compromised, can be employed by the malicious actor or the malicious software to steal sensitive information from mobile devices that connect to the compromised Wi-Fi access points. Where a user previously connected their mobile device to a Wi-Fi access point, but later the Wi-Fi access point becomes compromised unbeknownst to the user, the "default automatic reconnection" feature on the user's mobile device may automatically reconnect their mobile device to the compromised Wi-Fi access point without the user ever knowing that the Wi-Fi access point was compromised and without the user ever having a chance to prevent the automatic reconnection to the compromised Wi-Fi access point.

To avoid reconnecting to Wi-Fi access points which may later become compromised, one conventional solution if for a user to simply turn off the "default automatic reconnection" feature on their mobile device. However, employing this conventional solution of turning off this feature is unacceptable to many users because doing so eliminates the convenience of automatically reconnecting to any Wi-Fi access points, even those Wi-Fi access points which have never been compromised.

The subject matter claimed herein is not limited to embodiments that solve any disadvantages or that operate only in environments such as those described above. Rather, this background is only provided to illustrate one example technology area where some embodiments described herein may be practiced.

SUMMARY

In some embodiments, a computer-implemented method for protecting from automatic reconnection with Wi-Fi access points having bad reputations may be performed, at least in part, by a mobile device including at least one processor and by server device including at least one processor. The method may include determining, by the mobile device, that the mobile device is within range of a Wi-Fi access point. The method may also include determining, by the mobile device, that the mobile device is configured to automatically reconnect to the Wi-Fi access point. The method may further include receiving, at the server device from a mobile device, a request to indicate whether the Wi-Fi access point has a bad reputation. The method may also include accessing, by the server device, an access point reputation database to determine whether the Wi-Fi access point has a bad reputation. The method may further include sending, by the server device to the mobile device, an indication that the Wi-Fi access point has a bad reputation. The method may also include, in response to the indication that the Wi-Fi access point has a bad reputation, protecting the mobile device from the Wi-Fi access point by performing a remedial action at the mobile device.

In some embodiments, the performing of the remedial action at the mobile device may include one or more of blocking the mobile device from automatically reconnecting to the Wi-Fi access point, reconfiguring one or more settings on the mobile device to prevent the mobile device from automatically reconnecting to the Wi-Fi access point, or alerting a user of the mobile device that the Wi-Fi access point has a bad reputation, or some combination thereof.

In some embodiments, the mobile device being configured to automatically reconnect to the Wi-Fi access point may include the mobile device being configured to automatically reconnect to the Wi-Fi access point whenever the mobile device is within range of the Wi-Fi access point.

In some embodiments, the mobile device being configured to automatically reconnect to the Wi-Fi access point may include the mobile device being configured to automatically reconnect to the Wi-Fi access point without a user having to reenter a network security key of the Wi-Fi access point.

In some embodiments, the determining that the mobile device is configured to automatically reconnect to the Wi-Fi access point may include determining that the mobile device previously connected to the Wi-Fi access point, and determining that during the previous connection to the Wi-Fi access point a setting was set to allow automatic reconnection to the Wi-Fi access point by the mobile device. In these embodiments, the setting may have been set manually. Alternatively, in these embodiments, the setting may have been set automatically by default.

In some embodiments, a reputation of the Wi-Fi access point may have been switched from a good reputation to a bad reputation between a prior point in time at which the mobile device previously connected to the Wi-Fi access point and a later point in time at which the mobile device was determined to be within range of the Wi-Fi access point.

In some embodiments, a computer-implemented method for protecting from automatic reconnection with Wi-Fi access points having bad reputations may be performed, at least in part, by a mobile device including at least one processor. The method may include determining, by the mobile device, that the mobile device is within range of a Wi-Fi access point. The method may also include determining, by the mobile device, that the mobile device is configured to automatically reconnect to the Wi-Fi access point. The method may further include determining, by the mobile device, whether the Wi-Fi access point has a bad reputation. The method may also include, in response to determining that the Wi-Fi access point has a bad reputation, protecting the mobile device from the Wi-Fi access point by performing a remedial action at the mobile device.

In some embodiments, a computer-implemented method for protecting from automatic reconnection with Wi-Fi access points having bad reputations may be performed, at least in part, by a server device including at least one processor. The method may include receiving, at the server device from a mobile device, a request to indicate whether a Wi-Fi access point has a bad reputation. The mobile device may be within range of the Wi-Fi access point, and the mobile device may be configured to automatically reconnect to the Wi-Fi access point. The method may also include accessing, by the server device, an access point reputation database to determine whether the Wi-Fi access point has a bad reputation. The method may further include sending, by the server device to the mobile device, an indication that the Wi-Fi access point has a bad reputation to cause the mobile device to protect the mobile device from the Wi-Fi access point by performing a remedial action at the mobile device.

Further, in some embodiments, one or more non-transitory computer-readable media may include one or more computer-readable instructions that, when executed by one or more processors, cause the one or more processors to perform a method for protecting from automatic reconnection with Wi-Fi access points having bad reputations.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
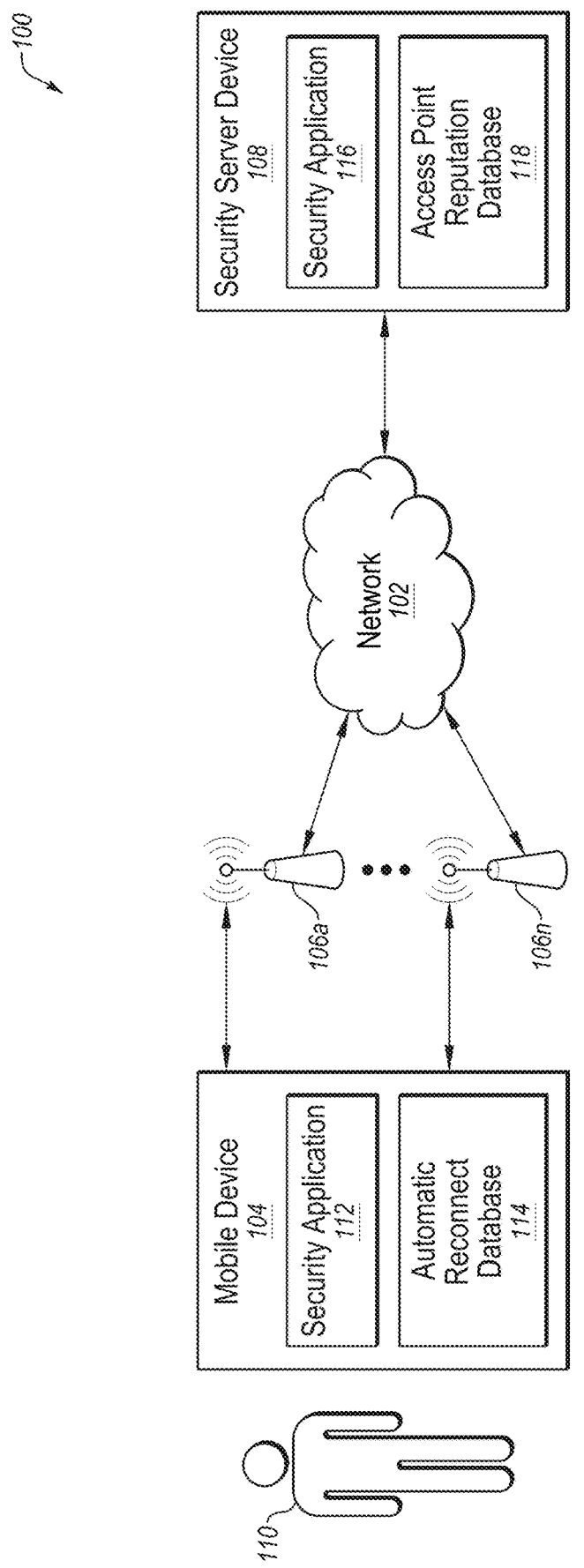
FIG. 1 illustrates an example system for protecting from automatic reconnection with Wi-Fi access points having bad reputations.

Mobile devices often connect to the Internet by first connecting to a Wi-Fi access point, which may be provided in public places such as coffee shops, libraries, airports, hotels, and other public places. After initially connecting their mobile device to a Wi-Fi access point by moving the mobile device within range of the Wi-Fi access point and then manually connecting to the Wi-Fi access point (which may also involve manually entering a network security key of the Wi-Fi access point), the mobile device may have a "default automatic reconnection" setting which may cause the mobile device to automatically reconnect to the Wi-Fi access point whenever the mobile device is again within range of the Wi-Fi access point, without requiring any action on the part of the user (including, where applicable, not requiring the user to manually reenter the network security key of the Wi-Fi access point).

Unfortunately, where a user previously connected their mobile device to a Wi-Fi access point, but later the Wi-Fi access point became compromised unbeknownst to the user, the "default automatic reconnection" setting on the mobile device may automatically reconnect the mobile device to the compromised Wi-Fi access point without the user ever knowing that the Wi-Fi access point was compromised and without the user ever having a chance to prevent the automatic reconnection to the compromised Wi-Fi access point. This automatic reconnection to a compromised Wi-Fi access point may expose the mobile device to likewise being compromised by the same malicious actor or malicious software that compromised the Wi-Fi access point, which may result in theft of sensitive information from the mobile device. The conventional solution of simply turning off the "default automatic reconnection" feature on their mobile device to avoid reconnecting to Wi-Fi access points which may later become compromised is unacceptable to many users because doing so eliminates the convenience of automatically reconnecting to any Wi-Fi access points, even those Wi-Fi access points which have never been compromised.

Some embodiments disclosed herein may protect from automatic reconnection with Wi-Fi access points having bad reputations. For example, a security application may be employed by a mobile device and/or by a server device. The security application may determine that the mobile device is within range of a Wi-Fi access point and that the mobile device is configured to automatically reconnect to the Wi-Fi access point. But prior to allowing any such automatic connection, the security application may first determine whether the Wi-Fi access point has a bad reputation in order to protect the mobile device from the Wi-Fi access point, if the Wi-Fi access point has a bad reputation, by performing a remedial action at the mobile device. The performing of the remedial action at the mobile device may include one or more of blocking the mobile device from automatically reconnecting to the Wi-Fi access point, reconfiguring one or more settings on the mobile device to prevent the mobile device from automatically reconnecting to the Wi-Fi access point, or alerting a user of the mobile device that the Wi-Fi access point has a bad reputation, or some combination thereof.

Thus, some embodiments disclosed herein may protect a user's mobile device from automatic reconnection with Wi-Fi access points having bad reputations, without requiring the user to turn off the "default automatic reconnection" feature on their mobile device, which may retain the convenience of automatically reconnecting to all other Wi-Fi access points that do not have bad reputations. Further, by avoiding automatic reconnection to a Wi-Fi access point having a bad reputation, a user may avoid having their mobile device being compromised by the same malicious actor or malicious software that compromised the Wi-Fi access point, which may avoid the theft of sensitive information from the mobile device.

Turning to the figures, FIG. 1 illustrates an example system 100 for protecting from automatic reconnection with Wi-Fi access points having bad reputations. The system 100 may include a network 102, a mobile device 104, Wi-Fi access points 106a-106n, and a security server device 108.

In some embodiments, the network 102 may be configured to communicatively couple the mobile device 104, the Wi-Fi access points 106a-106n, and the security server device 108 to one another, and to other devices, using one or more network protocols, such as the network protocols available in connection with the World Wide Web. In some embodiments, the network 102 may be any wired or wireless network, or combination of multiple networks, configured to send and receive communications (e.g., via data packets) between systems and devices. In some embodiments, the network 102 may include a Personal Area Network (PAN), a Local Area Network (LAN), a Metropolitan Area Network (MAN), a Wide Area Network (WAN), a Storage Area Network (SAN), the Internet, or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

In some embodiments, each of the Wi-Fi access points 106a-106n may be a networking hardware device that allows the mobile device 104 to wirelessly connect, over a Wi-Fi wireless connection, to the security server device 108, and to other devices, through the network 102. For example, each of the Wi-Fi access points 106a-106n may be associated with a hotspot, and each hotspot may have a physical range (e.g., a range of about 150 feet indoor, or a range of about 300 feet outdoors) within which Wi-Fi connections can be made between a device and each of the Wi-Fi access points 106a-106n. For example, when the mobile device 104 is connected over the network 102 to the security server device 108 through the Wi-Fi access point 106a but the mobile device 104 is physically moved out of the range of the hotspot of the Wi-Fi access point 106a, the mobile device 104 may lose Wi-Fi connectivity to the Wi-Fi access point 106a, and consequently also lose network connectivity to the security server device 108 through the network 102.

Figure 2:
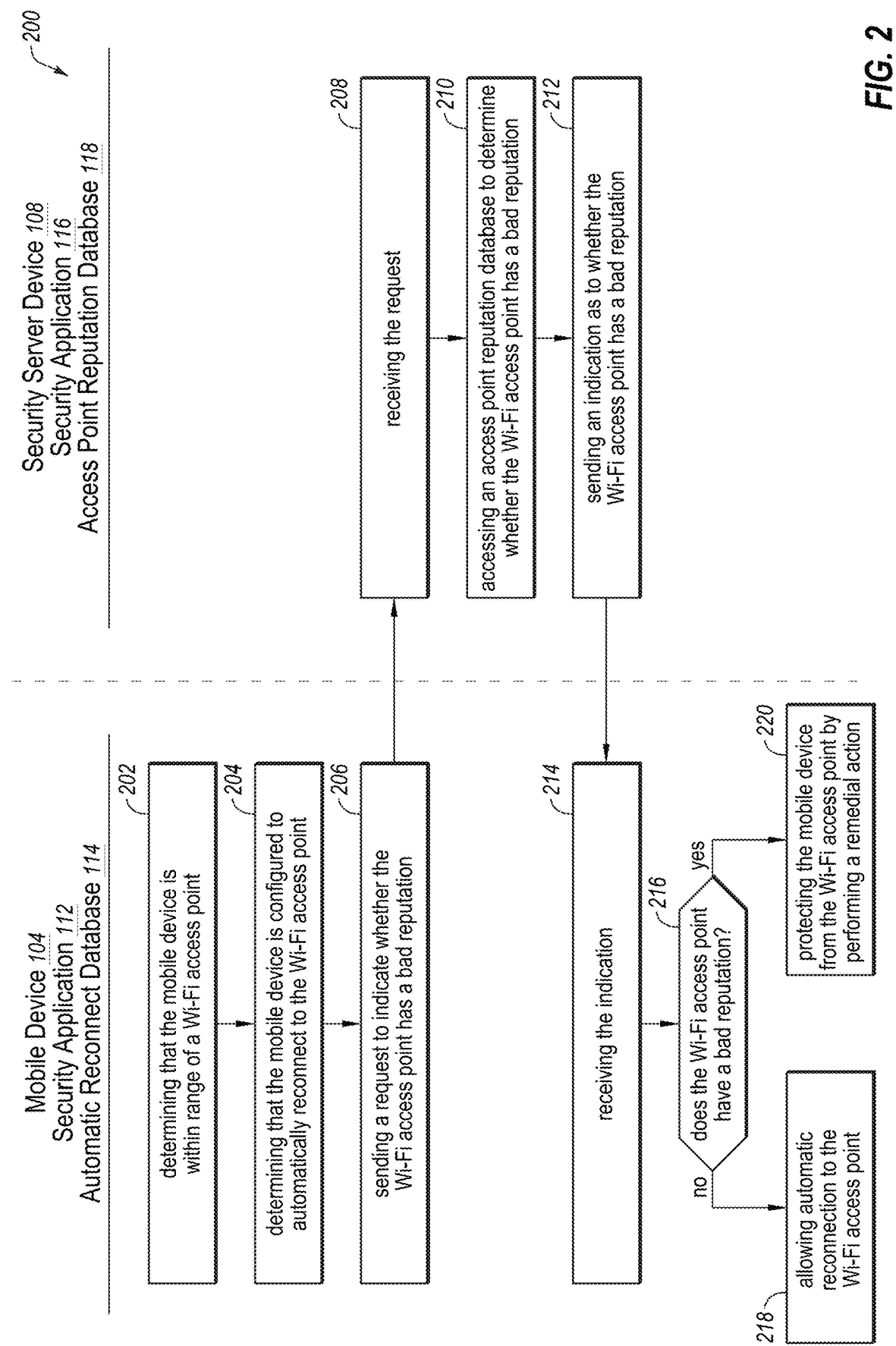
FIG. 2 is a flowchart of an example method for protecting from automatic reconnection with Wi-Fi access points having bad reputations.
Figure 3:
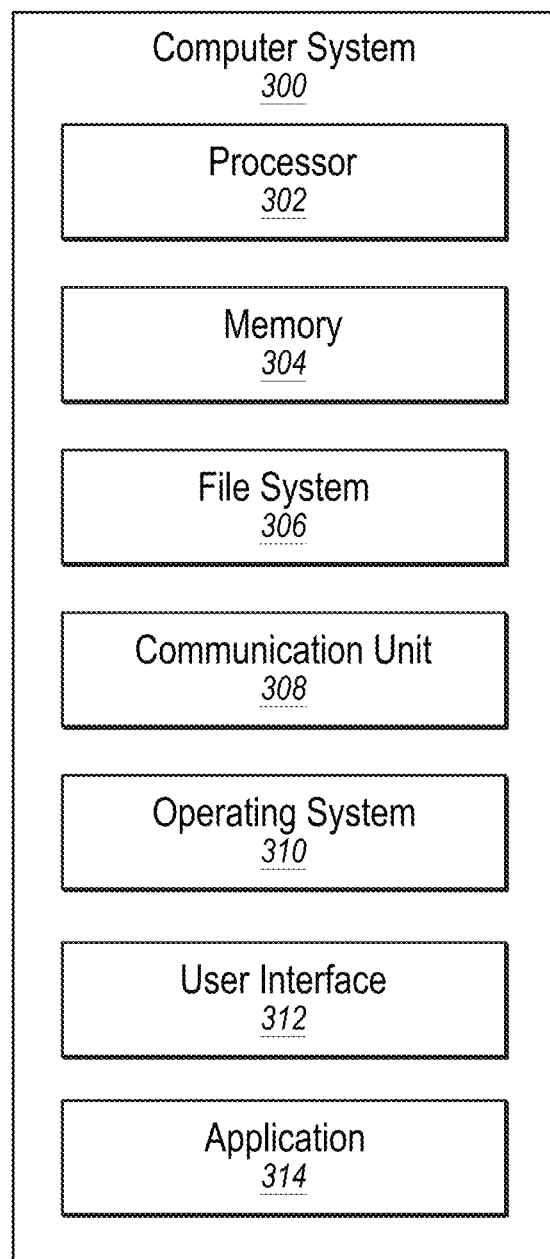
FIG. 3 illustrates an example computer system that may be employed for protecting from automatic reconnection with Wi-Fi access points having bad reputations.

In some embodiments, the mobile device 104 may be any computer system capable of communicating over the network 102 and capable of automatically reconnecting to the Wi-Fi access points 106a-106n, examples of which are disclosed herein in connection with the computer system 300 of FIG. 3. For example, each time that the mobile device 104 is initially (and potentially manually) connected by a user 110 of the mobile device 104 to a Wi-Fi access point (e.g., the Wi-Fi access point 106a), the mobile device 104 may add a reference to the Wi-Fi access point to an automatic reconnect database 114 (e.g., which may represent a "default automatic reconnection" setting in an operating system or application in the mobile device 104). Later, whenever the mobile device 104 again comes within range of the Wi-Fi access point (e.g., the Wi-Fi access point 106a), the mobile device 104 may check the automatic reconnect database 114 for a match (e.g., check whether a "default automatic reconnection" setting was set in the mobile device 104), and where a match is found, the mobile device 104 may automatically reconnect to the Wi-Fi access point (e.g., the Wi-Fi access point 106a) without requiring any action on the part of the user 110, including not requiring the user 110 to reenter any network security key of the Wi-Fi access point. The mobile device 104 may further execute a security application 112, which may be configured to protect the mobile device 104 from automatic reconnection with Wi-Fi access points having bad reputations, as discussed below in connection with FIG. 2.

In some embodiments, the security server device 108 may be any computer system capable of communicating over the network 102 and capable of hosting a security application 116 and an access point reputation database 118, examples of which are disclosed herein in connection with the computer system 300 of FIG. 3. In some embodiments, the access point reputation database 118 may be employed to store references to Wi-Fi access points that have bad reputations, which may be due to having been compromised in some way, such as by a malicious actor or by malicious software. In some embodiments, a reference to a particular Wi-Fi access point may further be removed from the access point reputation database 118 in the event that the reputation of the Wi-Fi access point is rehabilitated, such as by being re-secured subsequent to being compromised. In some embodiments, the access point reputation database 118 may be managed by a security company, such as NortonLifeLock Inc., to keep track of all known Wi-Fi access points connected to the Internet and their reputations, whether good or bad or somewhere along a continuum of good to bad. In these embodiments with a continuum, a threshold may be set for each mobile device, or a threshold may be set for groups of mobile devices or all mobile devices, that delineates between "bad" reputations, and other reputations. In some embodiments, an unknown reputation may be considered to be a "bad" reputation. Alternatively, in some embodiments, an unknown reputation may not be considered to be a "bad" reputation. In some embodiments, the access point reputation database 118 may be crowd-sourced, such as by allowing users to report Wi-Fi access points that have been compromised. In some embodiments, the access point reputation database 118 may be actively populated by a security company or other entity by actively probing Wi-Fi access points to determine their level of security and/or whether they have been compromised. In some embodiments, the security application 116 may be employed by the security server device 108 to protect the mobile device 104, and other mobile devices, from automatic reconnection with Wi-Fi access points having bad reputations, an may function in connection with, or in place of, the security application 112, as discussed below in connection with FIG. 2.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1. Further, in some embodiments, the mobile device 104 may be replaced by one or more non-mobile computer systems capable of connecting to a Wi-Fi access point. Therefore, the protection from automatic reconnection with Wi-Fi access points having bad reputations may be applied equally to non-mobile devices as it is to mobile devices, which may be useful where a Wi-Fi access point is mobile (e.g., on a train or airplane) and thus comes within range of a non-mobile device periodically.

FIG. 2 is a flowchart of an example method 200 for protecting from automatic reconnection with Wi-Fi access points having bad reputations. The method 200 may be performed, in some embodiments, by a device or system, such as by the security application 112 on the mobile device 104 and/or the security application 116 on the security server device 108. In these and other embodiments, the method 200 may be performed by one or more processors based on one or more computer-readable instructions stored on one or more non-transitory computer-readable media. The method 200 will now be described in connection with FIGS. 1 and 2.

The method 200 may include, at action 202, determining that the mobile device is within range of a Wi-Fi access point. For example, the security application 112 may determine, at action 202, that the mobile device 104 is within range of the Wi-Fi access point 106a.

The method 200 may include, at action 204, determining that the mobile device is configured to automatically reconnect to the Wi-Fi access point. In some embodiments, the mobile device being configured to automatically reconnect to the Wi-Fi access point may include the mobile device being configured to automatically reconnect to the Wi-Fi access point whenever the mobile device is within range of the Wi-Fi access point. In some embodiments, the mobile device being configured to automatically reconnect to the Wi-Fi access point may include the mobile device being configured to automatically reconnect to the Wi-Fi access point without a user having to reenter a network security key of the Wi-Fi access point. In some embodiments, the determining that the mobile device is configured to automatically reconnect to the Wi-Fi access point may include determining that the mobile device previously connected to the Wi-Fi access point, and determining that during the previous connection to the Wi-Fi access point a setting was set to allow automatic reconnection to the Wi-Fi access point by the mobile device. In these embodiments, the setting may have been set manually. Alternatively, in these embodiments, the setting may have been set automatically by default. For example, the security application 112 may determine, at action 204, that the mobile device 104 is configured to automatically reconnect to the Wi-Fi access point 106a, such as by determining that a "default automatic reconnection" setting is set (e.g., in an operating system setting) for the mobile device 104, which may involve finding a reference to the Wi-Fi access point 106a in the automatic reconnect database 114.

The method 200 may include, at action 206, sending and, at action 208, receiving a request to indicate whether the Wi-Fi access point has a bad reputation. For example, the security application 112 may send, at action 206, and the security application 116 may receive, at action 208, a request to indicate whether the Wi-Fi access point 106a has a bad reputation.

The method 200 may include, at action 210, accessing an access point reputation database to determine whether the Wi-Fi access point has a bad reputation. For example, the security application 116 may access, at action 210, the access point reputation database 118 to determine whether the Wi-Fi access point 106a has a bad reputation, such as by checking to see whether there is a reference to the Wi-Fi access point 106a in the access point reputation database 118, and/or by checking to see whether there is a reference to the Wi-Fi access point 106a in the access point reputation database 118 that is above a threshold that delineates "bad" reputations from reputation that are not considered "bad," such as a threshold of 80 on a continuum that goes from 0 to 100.

The method 200 may include, at action 212, sending and, at action 214, receiving an indication as to whether the Wi-Fi access point has a bad reputation. For example, the security application 116 may sent, at action 212, and the security application 112 may receive, at action 214, an indication as to whether the Wi-Fi access point 106a has a bad reputation.

The method 200 may include, at action 216, determining whether the Wi-Fi access point has a bad reputation. If not (no at action 216), the method 200 may include, at action 218, allowing automatic reconnection to the Wi-Fi access point, or if so (yes at action 216), the method 200 may include, at action 220, protecting the mobile device from the Wi-Fi access point by performing a remedial action. In some embodiments, a reputation of the Wi-Fi access point may have been switched from a good reputation to a bad reputation between a prior point in time at which the mobile device previously connected to the Wi-Fi access point and a later point in time at which the mobile device was determined to be within range of the Wi-Fi access point. In some embodiments, the performing of the remedial action at the mobile device may include one or more of blocking the mobile device from automatically reconnecting to the Wi-Fi access point, reconfiguring one or more settings on the mobile device to prevent the mobile device from automatically reconnecting to the Wi-Fi access point, or alerting a user of the mobile device that the Wi-Fi access point has a bad reputation, or some combination thereof. For example, the security application 112 may determine, at action 216 whether the Wi-Fi access point 106a has a bad reputation, such as by checking the indication received at action 214. If the Wi-Fi access point 106a does not have a bad reputation, the security application 112 may allow, at action 218, automatic reconnection of the mobile device 104 to the Wi-Fi access point 106a. On the other hand, if the Wi-Fi access point 106a does have a bad reputation (e.g., because the Wi-Fi access point 106a was compromised between a prior point in time at which the mobile device 104 previously connected to the Wi-Fi access point 106a and a later point in time at which the mobile device 104 was determined to be within range of the Wi-Fi access point 106a at action 202), the security application 112 may protect, at action 220, the mobile device 104 from the Wi-Fi access point 106a by performing a remedial action. In this example, the remedial action may include blocking the mobile device 104 from automatically reconnecting to the Wi-Fi access point 106a, reconfiguring one or more settings on the mobile device 104 to prevent the mobile device 104 from automatically reconnecting to the Wi-Fi access point 106a (e.g., by removing any reference to the Wi-Fi access point 106a from the automatic reconnect database 114), or alerting the user 110 of the mobile device 104 that the Wi-Fi access point 106a has a bad reputation (e.g., by displaying a security alert message on a display of the mobile device 104 or by sending an email or text with a security alert message to the user 110).

The method 200 may thus be employed, in some embodiments, to protect the mobile device 104 of the user 110 from automatic reconnection with a Wi-Fi access point 106a having a bad reputation, without requiring the user 110 to turn off the "default automatic reconnection" feature on their mobile device 104, which may retain the convenience of automatically reconnecting to all other Wi-Fi access points that do not have bad reputations. Further, by avoiding automatic reconnection to a Wi-Fi access point 106a having a bad reputation, the user 110 may avoid having their mobile device 104 being compromised by the same malicious actor or malicious software that compromised the Wi-Fi access point 106a, which may avoid the theft of sensitive information from the mobile device 104.

Although the actions of the method 200 are illustrated in FIG. 2 as discrete actions, various actions may be divided into additional actions, combined into fewer actions, reordered, expanded, or eliminated, depending on the desired implementation. For example, actions 204, 216, and 220 may be performed separately from the other actions of the method 200. In another example, actions 202, 204, 216, and 220 may be performed separately from the other actions of the method 200. In another example, actions 208, 210, and 212 may be performed separately from the other actions of the method 200. In another example, action 220 may be performed by a user or system administrator or other entity that is different from the entity performing the other actions of the method 200. In some embodiments, the action 204 may be performed on a Wi-Fi access point prior to the mobile device being within range of the Wi-Fi access point in order to preemptively determine whether the Wi-Fi access point has a bad reputation, and to perform a remedial action if appropriated, even before the mobile device is able to connect to the Wi-Fi access point.

Further, it is understood that the method 200 may improve the functioning of a mobile device itself and may improve the technical field of protecting against compromised Wi-Fi access points. For example, the functioning of the mobile device 104 of FIG. 1 may itself be improved by the method 200 by protecting the mobile device 104 from the Wi-Fi access point 106a that has a bad reputation by performing a remedial action at the mobile device 104, such as blocking the mobile device 104 from automatically reconnecting to the Wi-Fi access point 106a, reconfiguring one or more settings on the mobile device 104 to prevent the mobile device 104 from automatically reconnecting to the Wi-Fi access point 106a, or alerting the user 110 of the mobile device 104 that the Wi-Fi access point 106a has a bad reputation. Further, unlike conventional solutions which require a user to turn off the "default automatic reconnection" feature on their mobile device, the method 200 may protect the mobile device 104 from automatically reconnecting to a compromised Wi-Fi access point 106a without requiring the user 110 to turn off the "default automatic reconnection" feature on their mobile device 104.

FIG. 3 illustrates an example computer system 300 that may be employed in protecting from automatic reconnection with Wi-Fi access points having bad reputations. In some embodiments, the computer system 300 may be part of any of the systems or devices described in this disclosure. For example, the computer system 300 may be part of any of the mobile device 104 and the security server device 108 of FIG. 1.

The computer system 300 may include a processor 302, a memory 304, a file system 306, a communication unit 308, an operating system 310, a user interface 312, and an application 314, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 302 may include any suitable special-purpose or general-purpose computer, computing entity, or processing device including various computer hardware or software applications and may be configured to execute instructions stored on any applicable computer-readable storage media. For example, the processor 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 302 may interpret and/or execute program instructions and/or process data stored in the memory 304 and/or the file system 306. In some embodiments, the processor 302 may fetch program instructions from the file system 306 and load the program instructions into the memory 304. After the program instructions are loaded into the memory 304, the processor 302 may execute the program instructions. In some embodiments, the instructions may include the processor 302 performing one or more actions of the method 200 of FIG. 2.

The memory 304 and the file system 306 may include computer-readable storage media for carrying or having stored thereon computer-executable instructions or data structures. Such computer-readable storage media may be any available non-transitory media that may be accessed by a general-purpose or special-purpose computer, such as the processor 302. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 302 to perform a certain operation or group of operations, such as one or more actions of the method 200 of FIG. 2. These computer-executable instructions may be included, for example, in the operating system 310, in one or more applications, such as the security application 112 or the security application 116 of FIG. 1, or in some combination thereof.

The communication unit 308 may include any component, device, system, or combination thereof configured to transmit or receive information over a network, such as the network 102 of FIG. 1. In some embodiments, the communication unit 308 may communicate with other devices at other locations, the same location, or even other components within the same system. For example, the communication unit 308 may include a modem, a network card (wireless or wired), an infrared communication device, a wireless communication device (such as an antenna), and/or chipset (such as a Bluetooth device, an 802.6 device (e.g., Metropolitan Area Network (MAN)), a Wi-Fi device, a Wi-Max device, a cellular communication device, etc.), and/or the like. The communication unit 308 may permit data to be exchanged with a network and/or any other devices or systems, such as those described in the present disclosure.

The operating system 310 may be configured to manage hardware and software resources of the computer system 300 and configured to provide common services for the computer system 300.

The user interface 312 may include any device configured to allow a user to interface with the computer system 300. For example, the user interface 312 may include a display, such as an LCD, LED, or other display, that is configured to present video, text, application user interfaces, and other data as directed by the processor 302. The user interface 312 may further include a mouse, a track pad, a keyboard, a touchscreen, volume controls, other buttons, a speaker, a microphone, a camera, any peripheral device, or other input or output device. The user interface 312 may receive input from a user and provide the input to the processor 302. Similarly, the user interface 312 may present output to a user.

The application 314 may be one or more computer-readable instructions stored on one or more non-transitory computer-readable media, such as the memory 304 or the file system 306, that, when executed by the processor 302, is configured to perform one or more actions of the method 200 of FIG. 2. In some embodiments, the application 314 (e.g., app) may be part of the operating system 310 or may be part of an application of the computer system 300, or may be some combination thereof. In some embodiments, the application 314 may function as any of the security application 112 or the security application 116 of FIG. 1.

Modifications, additions, or omissions may be made to the computer system 300 without departing from the scope of the present disclosure. For example, although each is illustrated as a single component in FIG. 3, any of the components 302-314 of the computer system 300 may include multiple similar components that function collectively and are communicatively coupled. Further, although illustrated as a single computer system, it is understood that the computer system 300 may include multiple physical or virtual computer systems that are networked together, such as in a cloud computing environment, a multitenancy environment, or a virtualization environment.

As indicated above, the embodiments described herein may include the use of a special purpose or general-purpose computer (e.g., the processor 302 of FIG. 3) including various computer hardware or software applications, as discussed in greater detail below. Further, as indicated above, embodiments described herein may be implemented using computer-readable media (e.g., the memory 304 or file system 306 of FIG. 3) for carrying or having computer-executable instructions or data structures stored thereon.

In some embodiments, the different components and applications described herein may be implemented as objects or processes that execute on a computer system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first, "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for protecting from automatic reconnection with Wi-Fi access points having bad reputations, at least a portion of the method being performed by a mobile device comprising at least one processor and by a server device comprising at least one processor, the method comprising:
   determining, by the mobile device, that the mobile device is within range of a Wi-Fi access point to which the mobile device has previously connected, wherein at the time of the previous connection, the Wi-Fi access point had a good reputation;
   determining, by the mobile device, that the mobile device is configured to automatically reconnect to the Wi-Fi access point;

receiving, at the server device from the mobile device, a request to indicate whether the Wi-Fi access point has a bad reputation;

accessing, by the server device, an access point reputation database to determine whether the Wi-Fi access point has a bad reputation at the time of the request, wherein at some point in time subsequent to the previous connection, the reputation of the Wi-Fi access point changed from good to bad;

sending, by the server device to the mobile device, an indication that the Wi-Fi access point has a bad reputation; and in response to the indication that the Wi-Fi access point has a bad reputation, protecting the mobile device from the Wi-Fi access point by performing a remedial action at the mobile device.

2. The method of claim 1, wherein the performing of the remedial action at the mobile device comprises one or more of:
blocking the mobile device from automatically reconnecting to the Wi-Fi access point;
reconfiguring one or more settings on the mobile device to prevent the mobile device from automatically reconnecting to the Wi-Fi access point; or
alerting a user of the mobile device that the Wi-Fi access point has a bad reputation; or some combination thereof.

3. The method of claim 1, wherein the mobile device being configured to automatically reconnect to the Wi-Fi access point comprises the mobile device being configured to automatically reconnect to the Wi-Fi access point whenever the mobile device is within range of the Wi-Fi access point.

4. The method of claim 1, wherein the mobile device being configured to automatically reconnect to the Wi-Fi access point comprises the mobile device being configured to automatically reconnect to the Wi-Fi access point without a user having to reenter a network security key of the Wi-Fi access point.

5. The method of claim 1, wherein the determining that the mobile device is configured to automatically reconnect to the Wi-Fi access point comprises:
determining that during the previous connection to the Wi-Fi access point a setting was set to allow automatic reconnection to the Wi-Fi access point by the mobile device.

6. The method of claim 5, wherein the setting was set manually.

7. The method of claim 5, wherein the setting was set automatically by default.

8. A computer-implemented method for protecting from automatic reconnection with Wi-Fi access points having bad reputations, at least a portion of the method being performed by a mobile device comprising at least one processor, the method comprising:
determining, by the mobile device, that the mobile device is within range of a Wi-Fi access point to which the mobile device has previously connected, wherein at the time of the previous connection, the Wi-Fi access point had a good reputation;
determining, by the mobile device, that the mobile device is configured to automatically reconnect to the Wi-Fi access point;
determining, by the mobile device, whether the Wi-Fi access point has a bad reputation at the time of the request, wherein at some point in time subsequent to the previous connection, the reputation of the Wi-Fi access point changed from good to bad; and
in response to determining that the Wi-Fi access point has a bad reputation, protecting the mobile device from the Wi-Fi access point by performing a remedial action at the mobile device.

9. The method of claim 8, wherein the performing of the remedial action at the mobile device comprises one or more of:
blocking the mobile device from automatically reconnecting to the Wi-Fi access point;
reconfiguring one or more settings on the mobile device to prevent the mobile device from automatically reconnecting to the Wi-Fi access point; or
alerting a user of the mobile device that the Wi-Fi access point has a bad reputation; or some combination thereof.

10. The method of claim 8, wherein the mobile device being configured to automatically reconnect to the Wi-Fi access point comprises the mobile device being configured to automatically reconnect to the Wi-Fi access point whenever the mobile device is within range of the Wi-Fi access point.

11. The method of claim 8, wherein the mobile device being configured to automatically reconnect to the Wi-Fi access point comprises the mobile device being configured to automatically reconnect to the Wi-Fi access point without a user having to reenter a network security key of the Wi-Fi access point.

12. The method of claim 8, wherein the determining that the mobile device is configured to automatically reconnect to the Wi-Fi access point comprises:
determining that during the previous connection to the Wi-Fi access point a setting was set to allow automatic reconnection to the Wi-Fi access point by the mobile device.

13. The method of claim 12, wherein the setting was set manually.

14. The method of claim 12, wherein the setting was set automatically by default.

15. A computer-implemented method for protecting from automatic reconnection with Wi-Fi access points having bad reputations, at least a portion of the method being performed by a server device comprising at least one processor, the method comprising:
receiving, at the server device from a mobile device, a request to indicate whether a Wi-Fi access point has a bad reputation, the mobile device being within range of the Wi-Fi access point to which the mobile device has previously connected, wherein at the time of the previous connection, the Wi-Fi access point had a good reputation and the mobile device being configured to automatically reconnect to the Wi-Fi access point;
accessing, by the server device, an access point reputation database to determine whether the Wi-Fi access point has a bad reputation at the time of the request, wherein at some point in time subsequent to the previous connection, the reputation of the Wi-Fi access point changed from good to bad; and
sending, by the server device to the mobile device, an indication that the Wi-Fi access point has a bad reputation to cause the mobile device to protect the mobile device from the Wi-Fi access point by performing a remedial action at the mobile device.

16. The method of claim 15, wherein the performing of the remedial action at the mobile device comprises one or more of:

blocking the mobile device from automatically reconnecting to the Wi-Fi access point;
reconfiguring one or more settings on the mobile device to prevent the mobile device from automatically reconnecting to the Wi-Fi access point; or
alerting a user of the mobile device that the Wi-Fi access point has a bad reputation; or some combination thereof.

17. The method of claim 15, wherein the mobile device being configured to automatically reconnect to the Wi-Fi access point comprises the mobile device being configured to automatically reconnect to the Wi-Fi access point whenever the mobile device is within range of the Wi-Fi access point.

18. The method of claim 15, wherein the mobile device being configured to automatically reconnect to the Wi-Fi access point comprises the mobile device being configured to automatically reconnect to the Wi-Fi access point without a user having to reenter a network security key of the Wi-Fi access point.

* * * * *